Patented May 5, 1942

2,282,115

UNITED STATES PATENT OFFICE 2,282,115

TRINUCLEAR POLYMETHINE DYES

Leslie G. S. Brooker and Frank L. White, Rochester, N. Y., assignors to Eastman Kodak Company, Rochester, N. Y., a corporation of New Jersey No Drawing. Application December 16, 1939, Serial No. 309,686. In Great Britain March 7, 1939

11 Claims. (Cl. 260—240)

This invention relates to trinuclear polymethine dyes and to a process for the preparation thereof.

Cyanine dyes always contain at least two auxochromic nitrogen atoms, the one ternary and the other quaternary, linked together by a conjugated carbon chain, each of which nitrogen atoms lies in a heterocyclic nucleus. A few cyanine dyes are known which contain three auxochromic nitrogen atoms, at least one of which is ternary and at least one other of which is quaternary, each ternary nitrogen atom being linked to each quaternary nitrogen atom by a conjugated carbon chain, and each nitrogen atom lying in a heterocyclic nucleus. These cyanine dyes containing three auxochromic nitrogen atoms are sometimes called trinuclear cyanine dyes.

Thus, neocyanine, according to one view of its structure, is a cyanine dye containing three auxochromic nitrogen atoms each of which lies in a quinoline nucleus, as shown in the following formula:

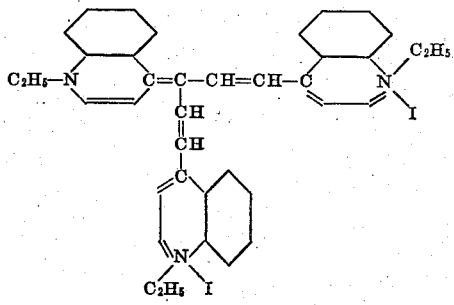

According to this formula, neocyanine contains two quaternary auxochromic nitrogen atoms each of which is linked to a ternary auxochromic nitrogen atom by a conjugated carbon chain. However, the structure of neocyanine is as yet unsettled, and according to another view, the structure is represented by the following formula:

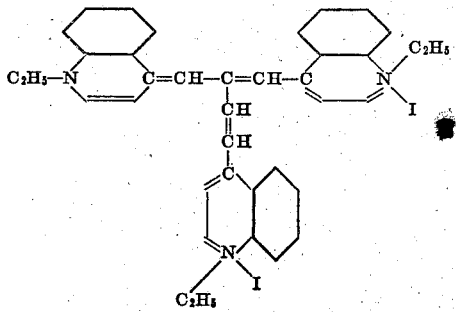

According to this formula, but one of the quaternary nitrogen atoms is linked by a conjugated carbon chain to the ternary nitrogen atom.

Neothiazolocarbocyanine dyes are described in United States Patent 1,969,445, dated August 7, 1934.

Another kind of trinuclear cyanine dye, containing two ternary auxochromic nitrogen atoms and one quaternary auxochromic nitrogen atom, is described in United States Patent 2,108,845, dated February 22, 1938. A typical example of such a kind of trinuclear cyanine dye can be represented by the following formula:

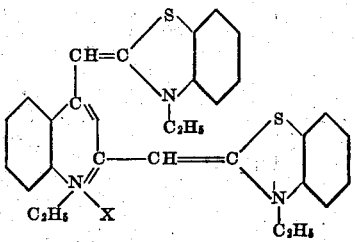

Such a dye can be formed by the interaction of one molecular proportion of a 2,4-diiodoquinoline quaternary salt with two molecular proportions of a 1-methylbenzothiazole quaternary salt. Such trinuclear cyanine dyes necessarily contain a quinoline nucleus.

The processes by which these known trinuclear dyes are prepared are of but limited application, so that only a few trinuclear cyanine dyes have been made available.

We have now found a new method for preparing trinuclear cyanine dyes. Our new method gives rise to trinuclear cyanine dyes of a type different from either of the known types. Moreover, our new process makes available for the first time trinuclear cyanine dyes, of any type, which contain three different heterocyclic nuclei.

We have also found a further process which gives rise to new trinuclear dyes which are merocyanine dyes.

We have also found that our new dyes sensitize photographic silver halide emulsions in a useful manner.

It is accordingly an object of our invention, therefore, to provide new dyes. A further object is to provide a process for preparing such dyes. A further object is to provide photographic emulsions sensitized with such dyes. Other objects will become apparent hereinafter.

The new trinuclear cyanine dyes obtainable according to our invention can be represented by the following general formula:

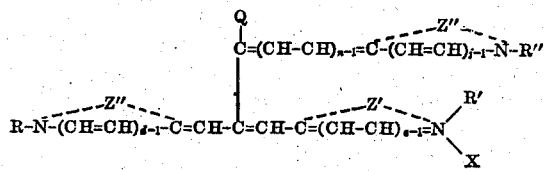

wherein $d$, $e$, $f$ and $n$ represent a positive integer of from one to two, Q represents hydrogen or an alkyl group, R, R' and R" represent alkyl groups, such as methyl, ethyl, isoamyl, allyl, benzyl, β-hydroxyethyl or β-ethoxyethyl for example, X represents an acid radical, such as halide, p-toluenesulfonate, or perchlorate for example, and Z, Z' and Z" represent the non-metallic atoms necessary to complete an organic heterocyclic nucleus, such as benzothiazole, benzoxazole, benzoselenazole, naphthoxazole, naphthothiazole or quinoline nuclei for example.

According to our invention, we prepare our new dyes formulated above by reacting a carbocyanine dye or salt having an alkyl group on the central carbon atom of the trimethenyl chain with a cyclammonium quaternary salt containing, in the alpha or gamma position, i. e. one of the so-called reactive positions, an alkylmercapto group, an arylmercapto group, an aryloxy group, a halogen atom or a β-arylaminovinyl group.

Carbocyanine dyes having a methyl group on the central carbon atom of the trimethine chain are advantageously employed. The carbocyanine dyes are advantageously employed in the form of their p-toluenesulfonates, although any dye-salt can be employed.

The reactions are advantageously effected in the presence of an acid-binding (or basic condensing) agent. As acid-binding agents, salts of weak acids and strong bases are suitable, e. g. sodium carbonate and potassium acetate. More advantageously, however, strong organic bases, i. e. organic bases having a dissociation constant substantially greater than that of pyridine, are employed. Piperidine, N-methylpiperidine, triethylamine and triethanolamine are examples of such strong organic bases. Where cyclammonium quaternary salts containing an alkylmercapto group, an arylmercapto group, an aryloxy group or halogen atom are employed, it is advantageous to use strong tertiary organic bases.

The reactions are advantageously effected in the presence of a diluent. As diluents, pyridine, methyl alcohol, ethyl alcohol and isopropyl alcohol are advantageously employed. Heat accelerates the formation of our new dyes.

Where cyclammonium quaternary salts containing a β-arylaminovinyl group are employed, it is ordinarily advantageous to use the salt in the form where the β-arylaminovinyl group is acylated, e. g. β-acetanilidovinyl.

The following examples will serve to demonstrate the manner of practicing our invention. These examples are not intended to limit our invention.

EXAMPLE 1.—3,3'-diethyl-9-[(3-methyl-2(3)-benzothiazolylidene) methyl] - thiacarbocyanine bromide

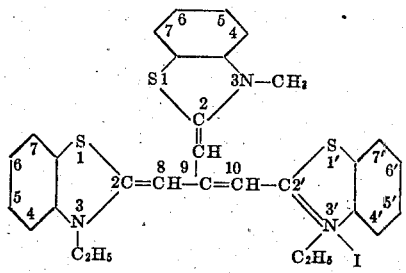

1.10 g. (1 mol.) of 3,3'-diethyl-9-methyl-thiacarbocyanine p-toluenesulfonate, 1.11 g. (1.5 mol.) of 2-methylmercapto-benzothiazole metho-p-toluenesulfonate and 0.30 g. (1.5 mol.) of triethylamine were mixed together in 10 cc. of dry pyridine. The resulting mixture was boiled, under reflux, for about 20 minutes. The reaction mixture was then cooled and stirred with 150 cc. of diethyl ether. The resulting mixture was chilled to 0° C. for several hours. The ether layer was then removed and the residue was dissolved in hot methyl alcohol (25 cc.). The hot methyl alcoholic solution was then mixed with a hot solution of potassium bromide (2 g. dissolved in 25 cc. water). The resulting mixture was chilled at 0° C. for a few hours. The dye-bromide separated out of the mixture. It was filtered off and washed on the filter with water. It was then boiled with 20 cc. of acetone. The acetone mixture was chilled to 0° C., the dye filtered off and washed on the filter with acetone and finally dried in the air. The yield of dye at this point was 74%. The dye was recrystallized from methyl alcohol (55 cc. per gram of dye) and a 55% yield of purified dye was obtained in in the form of fine dark green needles, melting at 192° to 195° C. with decomposition.

EXAMPLE 2.—3,3'-diethyl-9-[(1-ethyl-2(1)-quinolylidene) methyl]-thiacarbocyanine iodide

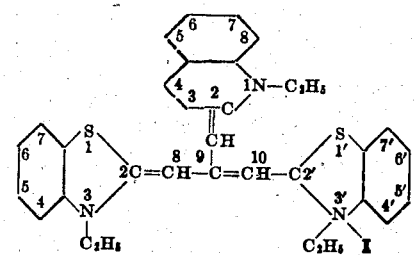

1.10 g. (1 mol.) of 3,3'-diethyl-9-methylthiacarbocyanine p-toluenesulfonate, 1.2 g. (1.5 mols.) of 2-phenylmercaptoquinoline ethiodide and 0.6 g. 3 mols.) of triethylamine were mixed together in 10 cc. of dry pyridine. The resulting mixture was boiled, under reflux, for about 20 minutes. The reaction mixture was then cooled and stirred with 200 cc. of diethyl ether. The ethereal mixture was chilled at 0° C. for several hours, after which the ethereal layer was removed. The residue was dissolved in hot methyl alcohol (25 cc.) and the hot methyl alcoholic solution was then mixed with a hot solution of potassium iodide (1.5 g. dissolved in 25 cc. of water). The resulting mixture was then chilled to 0° C. The dye-iodide separated from the reaction mixture and was filtered off and washed on the filter with water. The dye was then boiled with 20 cc. of acetone, the acetone mixture chilled to 0° C., then filtered off and washed on the filter with acetone and finally dried in the air. The yield of dye at this point was 42%. It was recrystallized from methyl alcohol (280 cc. per gram of dye) and a 23% yield of purified dye was obtained in the form of bronze green crystals, melting at 275° to 276° C. with decomposition.

The same dye was obtained as follows: 1.10 g. (1 mol.) of 3,3'-diethyl-9-methylthiacarbocyanine p-toluenesulfonate, 0.82 g. (1 mol.) of 2-iodoquinoline ethiodide and 0.45 g. (2.1 mols.) of triethylamine were mixed together in 25 cc. of absolute ethyl alcohol. The mixture was boiled, under reflux, for about 30 minutes. The reaction mixture was cooled and filtered to remove unreacted 3,3' - diethyl - 9 - methylthiacarbocyanine iodide. The filtrate was then concentrated to 5 to 10 cc. and then chilled to 0° C. The trinuclear dye-iodide separated out. It was filtered off and recrystallized from methyl alcohol.

EXAMPLE 3.—3,3'-diethyl-9-[(3-methyl-2(3)-benzothiazolylidene) methyl] - 4,5,4',5' - dibenzothiacarbocyanine bromide

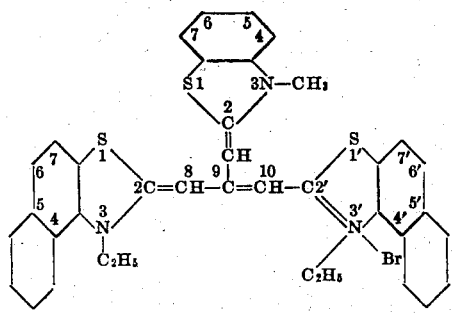

1.03 g. (1 mol.) of 3,3'-diethyl-9-methyl-4,5,4',5'-dibenzothiacarbocyanine chloride, 1.11 g. (1.5 mols.) of 2-methylmercaptobenzothiazole metho-p-toluenesulfonate and 0.30 g. (1.5 mols.) of triethylamine were mixed together in 10 cc. of pyridine. The resulting mixture was boiled, under reflux, for 20 minutes. The dye was isolated as the bromide as in Example 1. The yield of dye at this point was 82%. It was recrystallized from methyl alcohol (120 cc. per gram of dye) and a 50% of purified dye was obtained in the form of minute dark green crystals, melting at 202° to 204° C. with decomposition.

EXAMPLE 4.—3,3'-diethyl-9-[(3-methyl-2(3)-benzothiazolylidene) methyl]-selenacarbocyanine bromide

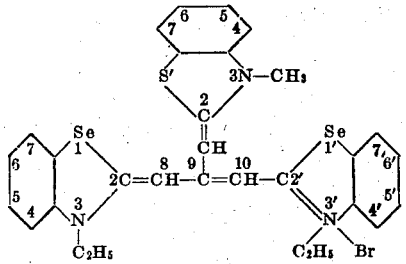

1.10 g. 1 mol.) of 3,3'-diethyl-9-methyl-selenacarbocyanine bromide, 1.11 g. (1.5 mols.) of 2-methylmercaptobenzothiazole metho-p-toluenesulfonate and 0.3 g. (1.5 mols.) of triethylamine were mixed together in 10 cc. of dry pyridine. The mixture was boiled, under reflux, for about 20 minutes. The cooled reaction mixture was stirred with 200 cc. of diethyl ether. The ethereal mixture was chilled at 0° C. for several hours. The ethereal layer was then removed and the residue was boiled with 20 cc. of acetone. The acetone mixture was chilled to 0° C. and the dye filtered off and washed on the filter with acetone and finally dried in the air. The yield of dye at this point was 100%. It was recrystallized from methyl alcohol (65 cc. per gram of dye) and the yield of purified dye was 61%. The dye was obtained in the form of reddish purple needles, having a green reflux and melting at 213 to 215° C. with decomposition.

EXAMPLE 5.—3,3'-diethyl-9-[(3-methyl-2(3)-benzothiazolylidene) methyl]-4',5'-benzoxathiacarbocyanine

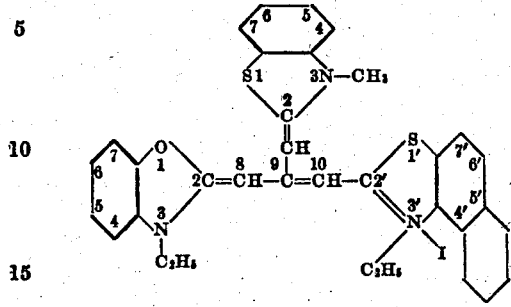

1.08 g. (1 mol.) of 3,3'-diethyl-9-methyl-4',5'-benzoxathiacarbocyanine iodide, 2.22 g. (3.0 mols.) of 2-methylmercaptobenzothiazole metho-p- toluenesulfonate and 0.6 g. (3.0 mols.) of triethylamine were mixed together in 10 cc. of pyridine. The mixture was boiled, under reflux, for about 20 minutes. The hot reaction mixture was treated with 40 cc. of a hot aqueous potassium iodide (10%) solution. The resulting mixture was chilled at 0° C. for several hours. The dye which separated was filtered off and washed on the filter with water. It was then suspended in 15 cc. of hot acetone. The suspension was chilled at 0° C. for several hours. The dye was filtered off and washed on the filter with acetone, and finally dried in the air. The yield of dye was 81% and after three recrystallizations from methyl alcohol (310 cc. per gram of dye) the yield was 15%. The dye was obtained as green crystals melting at 237 to 238° C. with decomposition.

EXAMPLE 6.—3,3'-diethyl-9-[(1-ethyl-2(1)-quinolylidene) methyl]-4',5'-benzothiazolylidene iodide

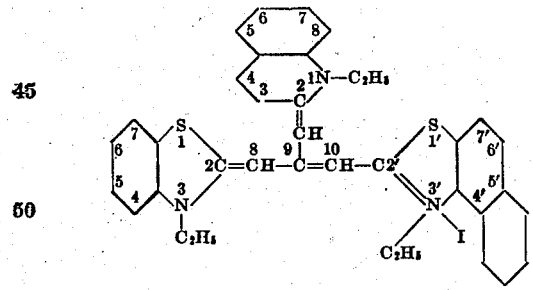

1.0 g. (1 mol.) of 3,3'-diethyl-9-methyl-thiacarbocyanine-p-toluenesulfonate, 1.10 g. (1.5 mols.) of 2-phenylmercaptoquinoline etho-p-toluenesulfonate and 0.25 g. (1.5 mols.) of triethylamine were mixed together in 10 cc. of dry pyridine. The mixture was boiled, under reflux, for about 20 minutes. The hot reaction mixture was mixed with a hot solution of potassium iodide (2 g. dissolved in 30 cc. of water). The resulting mixture was chilled at 0° C. for several hours. The dye was then filtered off and washed on the filter with water. The dye was then boiled with acetone. The acetone mixture was chilled at 0° C. for several hours. The dye was filtered off, washed on the filter with acetone and finally dried in the air. The yield of dye was 70%. The dye was twice recrystallized from methyl alcohol (550 cc. per gram of dye) and an 18% yield of purified dye was obtained. The dye was obtained in the form of green crystals melting at 224 to 225° C. with decomposition.

EXAMPLE 7.—*3,3'-diethyl-9-[(1-ethyl-2(1)-quinolylidene)methyl] - 4',5'- benzoxathiacarbocyanine iodide*

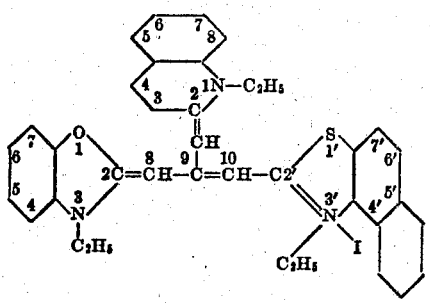

1.08 g. (1 mol.) of 3,3'-diethyl-9-methyl-4',5'-benzoxathiacarbocyanine iodide, 1.31 g. (1.5 mols.) of 2-phenylmercaptoquinoline etho-p-toluenesulfonate and 0.3 g. (1.5 mols.) of triethylamine were mixed together in 10 cc. of dry pyridine. The mixture was boiled, under reflux, for 20 minutes. The hot reaction mixture was mixed with a hot solution of potassium iodide (2 g. dissolved in 30 cc. of water). The resulting mixture was chilled several hours at 0° C. The dye was then filtered off and washed on the filter with water. The dye was then boiled with 20 cc. of acetone and the acetone mixture was chilled at 0° C. for several hours. The dye was then filtered off, washed on the filter with acetone and finally dried in the air. The yield of crude dye was 43%. It was twice recrystallized from methyl alcohol (60 cc. per gram of dye) and a yield of purified dye of 18% was obtained. The dye was obtained as dark green crystals melting at 210° to 212° C. with decomposition.

EXAMPLE 8.—*3,3'-diethyl-9-[(3-ethyl-2(3)-benzothiazolylidene) methyl] - oxacarbocyanine iodide*

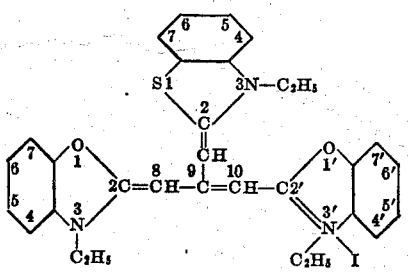

1.04 g. (1 mol.) of 3,3'-diethyl-9-methyloxacarbocyanine p-toluenesulfonate, 3.55 g. (4 mols.) of 2-phenylmercaptobenzothiazole etho-p-toluenesulfonate and 0.8 g. (4 mols.) of triethylamine were mixed together in 10 cc. of dry pyridine. The mixture was boiled, under reflux, for 15 minutes. The hot reaction mixture was mixed with 50 cc. of a 10% aqueous solution of potassium iodide. The resulting mixture was chilled at 0° C. for several hours. The dye was then filtered off, washed on the filter with water and then stirred with 20 cc. of hot acetone. The acetone mixture was chilled at 0° C. for a few hours, after which the dye was filtered off, washed on the filter with acetone and then dried in the air. At this point, the yield of crude dye was 47%. The dye was thrice recrystallized from methyl alcohol and a yield of 6% of purified dye was obtained. The dye was in the form of orange needles, having a green reflex and melting at 234° to 235° C. with decomposition.

EXAMPLE 9.—*5,5'-dichloro-2,3'-diethyl-9[α-(3-methyl-2(3)- benzothiazolylidene)ethyl]- thiacarbocyanine iodide*

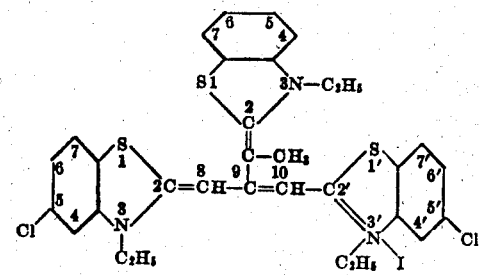

1.09 g. (1 mol.) of 5,5'-dichloro-3,3',9-triethylthiacarbocyanine bromide, 2.94 g. (4 mols.) of 2-methylmercaptobenzothiazole metho-p-toluenesulfonate and 0.81 g. (4 mols.) of triethylamine were mixed together in 10 cc. of dry pyridine. The mixture was boiled, under reflux, for about 7 minutes. The hot reaction mixture was then mixed with 20 cc. of a hot 10% aqueous solution of potassium iodide. The resulting mixture was chilled at 0° C. for a few hours. The dye was filtered off and washed on the filter with water. The dye was then suspended in 50 cc. of a methyl alcohol-acetone mixture (equal parts by volume) and the suspension chilled at 0° C. for a few hours. The dye was then filtered off, washed on the filter with acetone and finally dried in the air. At this point, the yield of crude dye was 68%. It was twice recrystallized from methyl alcohol and a yield of purified dye of 12% was obtained. The dye was in the form of green crystals, having a shiny reflex, and melting at 260° to 261° C. with decomposition.

EXAMPLE 10.—*3,3'- diethyl - 9 -[(3-ethyl-2(3)-benzothiazolylidene) methyl]-thiadicarbocyanine iodide*

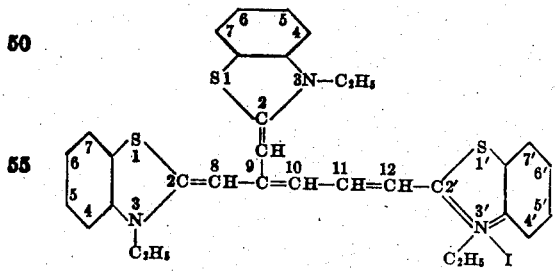

1.10 g. (1 mol.) of 3,3'-diethyl-9-methylthiacarbocyanine p-toluenesulfonate, 2.7 g. (3 mols.) of 2-(β-acetanilidovinyl)-benzothiazole ethiodide and 0.66 g. (3.3 mols.) of triethylamine were mixed together in 15 cc. of dry pyridine. The resulting mixture was boiled, under reflux, for one minute. The hot reaction mixture was mixed with a hot solution of potassium iodide (2 g. dissolved in 20 cc. of water). The resulting mixture was chilled at 0° C. for several hours. The dye was then filtered off and washed on the filter with water. The dye was then boiled with 10 cc. of methyl alcohol. The methyl alcoholic mixture was cooled to about 25° C. and the dye was filtered off and washed on the filter with a little methyl alcohol and finally dried in the air. The yield of dye at this point was 58%. It was twice recrystallized from methyl alcohol (155 cc. per gram of dye) and a yield of purified dye of 29% was obtained in the form of coppery crystals melting at 209° to 211° C. with decomposition.

EXAMPLE 11.—1',3 - diethyl - 9 - [(3-ethyl- 2 (3) - benzooxazolylidene) methyl] - 4,5 - benzothia-4'- carbocyanine perchlorate

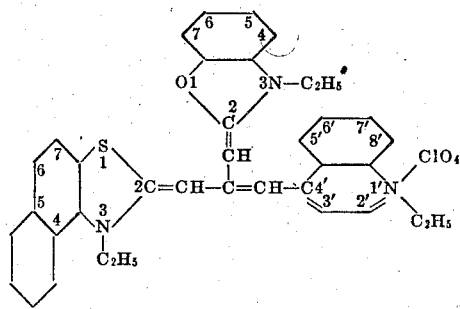

0.68 g. (1 mol.) of 3.3'-diethyl-9-methyl-4',5'-benzooxathiacarbocyanine iodide and 0.78 g. (1.5 mols.) of 4-(n-heptyl)-mercaptoquinoline ethiodide were mixed together in 25 cc. of dry pyridine containing 0.19 g. (1.5 mols.) of triethylamine. The mixture was boiled, under reflux, for about 15 minutes. The cooled blue reaction mixture was then stirred with 300 cc. of diethyl ether and the ethereal mixture was chilled at 0° C. for several hours. The dye which separated was then filtered off and washed on the filter with water. The residue was stirred with 20 cc. of boiling acetone. The acetone mixture was then chilled at 0° C. for several hours. The dye was filtered off and washed on the filter with acetone. The acetone filtrate and washings were carefully concentrated to nearly dryness. The residue was dissolved in 10 cc. of hot methyl alcohol. The hot methyl alcoholic solution was mixed with 10 cc. of a hot 10% aqueous solution of sodium perchlorate. Upon chilling the resulting mixture to 0° C., the dye-perchlorate separated out. It was filtered off and washed on the filter with water and finally dried in the air. A 70% yield of dye was thus obtained and after two recrystallizations from absolute ethyl alcohol (400 cc. per gram of dye) the yield was 17%. The purified dye was obtained as dark crystals which began to decompose at 175° C.

The 4-(n-heptyl)-mercaptoquinoline ethiodide was prepared by reacting 8.1 g. (1 mol.) of 4-(n-heptyl)-mercaptoquinoline with 14.5 g. (3 mols.) of ethyl iodide in a sealed glass tube at 25° C. for about 60 hours. Upon opening the tube, the orange crystalline mass was collected on a filter and washed with 5 g. of ethyl iodide. The filtrate and washings were heated in a sealed glass tube at 100° C. for 8 hours. The brown semi-solid material was stirred with diethyl ether and then with acetone. The crystals thus obtained were added to those obtained from the first reaction. The whole was recrystallized from absolute ethyl alcohol and obtained as yellow crystals melting at 139° to 140° C. with decomposition.

The 4-(n-heptyl)-mercaptoquinoline was prepared by heating a solution of 4-chloroquinoline with n-heptylmercapton in n-heptyl alcohol, in the presence of potassium hydroxide, at 95° C. for 48 hours. The solid reaction mass was dissolved in water and the solution was treated with an excess of sodium hydroxide. The 4-(n-heptyl)-mercaptonquinoline and n-heptyl alcohol were taken up in diethyl ether, the ethereal extract dried over anhydrous potassium carbonate and, after removing the potassium carbonate, fractionally distilled. The 4-(n-heptyl)-mercaptoquinoline was obtained as a liquid boiling at 180 to 183° C. at 2 mm. of mercury pressure.

The new merocyanine dyes containing three heterocyclic nuclei and obtainable according to our invention can be represented by the following general formula:

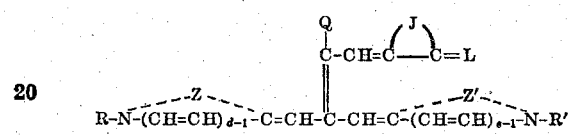

wherein d and e each represent a positive integer of from one to two, L represents oxygen or sulfur, Q represents hydrogen or an alkyl group, R and R' represent alkyl groups, such as methyl, ethyl, isoamyl, allyl, benzyl, β-hydroxyethyl or β-ethoxyethyl for example, J represents the non-metallic atoms to complete an organic heterocyclic nucleus, such as a rhodanine nucleus, a thio-rhodanine nucleus or a 2-thio-2,4(3,5)-oxazoledione nucleus for example and Z and Z' represent the non-metallic atoms necessary to complete an organic heterocyclic nucleus, such as benzothiazole, benzoxazole, benzoselenazole, naphthothiazole, naphthoxazole, quinoline nuclei for example.

According to our invention, we prepare our new merocyanine dyes by reacting a carbocyanine dye or salt containing an alkyl group on the central carbon atom of the trimethenyl chain with a heterocyclic organic compound containing a nuclear carbonyl group (oxo or thio) adjacent to a nuclear carbon atom attached to which is an acylated arylaminomethylene group.

Carbocyanine dyes having a methyl group on the central carbon atom of the trimethine chain, are advantageously employed. The carbocyanine dyes are advantageously employed in the form of their p-toluenesulfonates, although any dye-salt can be employed.

The reactions are advantageously effected in the presence of an acid-binding (or basic condensing) agent. As acid-binding agents, salts of weak acids and strong bases are suitable, e. g. sodium carbonate or potassium acetate. More advantageously, however, strong organic bases, are employed.

The reactions are advantageously effected in the presence of a diluent. As diluents, pyridine, methyl alcohol, ethyl alcohol and isopropyl alcohol are advantageously employed. Heat accelerates the formation of our new merocyanine dyes.

As heterocyclic compounds containing a nuclear carbonyl group adjacent to a nuclear carbon atom attached to which is an acylated arylaminomethylene group, the acetylated compounds are advantageously employed.

The following examples will serve to illustrate the manner of preparing our new merocyanine dyes. These examples are not intended to limit our invention.

EXAMPLE 12.—*3 - ethyl-5-{3,3-di-[(2-ethyl-2(3)-benzothiazolylidene)-methyl]-allylidene}-rhodanine*

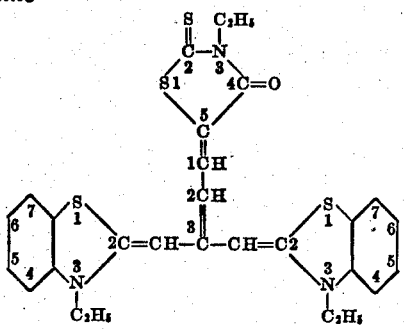

1.10 g. (1 mol.) of 3,3'-diethyl-9-methylthiacarbocyanine p-toluenesulfonate, 0.61 g. (1 mol.) of 5-acetanilidomethylene and 0.2 g. (1 mol.) of triethylamine were mixed together in 10 cc. of dry pyridine. The mixture was boiled, under reflux, for 15 minutes. The cooled reaction mixture was stirred with 200 cc. of diethyl ether and the ethereal mixture was chilled at 0° C. for several hours. The dye was then filtered off and stirred with 25 cc. of boiling methyl alcohol. The methyl alcoholic mixture was chilled at 0° C. for two hours. The dye was then filtered off and washed on the filter with methyl alcohol until the washings were colorless. At this point, the yield of crude dye was 46%. 0.5 g. of the crude dye were dissolved in 10 cc. of hot pyridine and to the solution, 10 cc. of hot methyl alcohol were added. The resulting mixture was allowed to cool and the dye which separated was filtered off, washed on the filter with methyl alcohol and finally dried in the air. In this manner, a 23% yield of purified dye, as a mat of dull green crystals, melting at 194° to 196° C. with decomposition, was obtained.

EXAMPLE 13.—*3 - ethyl-5-{3,3-di-[(3-ethyl-2(3)-benzothiazolylidene)-methyl - allylidene} - 2 - thio-2,4(3,5)-oxazolidione*

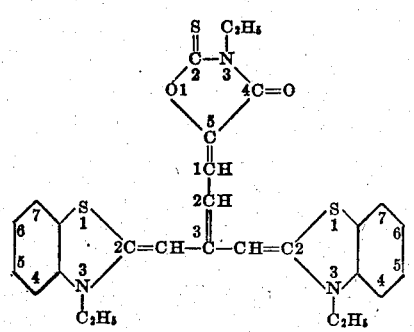

1.10 g. (1 mol.) of 3,3'-diethyl-9-methylthiacarboxyanine p-toluenesulfonate, 1.16 g. (2 mols.) of 5-acetanilidomethylene - 3- ethyl - 2 - thio-2,4 (3,5)-oxazoledione and 0.4 g. (2 mols.) of triethylamine were mixed together in 15 cc. of pyridine. The mixture was boiled, under reflux, for 20 minutes. The cool reaction mixture was stirred with 250 cc. of diethyl ether. The ethereal mixture was chilled at 0° C. for several days. The ethereal layer was then decanted and the residue was stirred with 10 cc. of methyl alcohol. The dye was then filtered off and washed on the filter with methyl alcohol and finally dried in the air. At this point, the yield of crude dye was 14%. It was recrystallized from acetone (20 cc. per gram of dye) and a yield of 9% of purified dye, as dark crystals melting at 138° to 139° C. with decomposition, was obtained.

EXAMPLE 14.—*3 - ethyl-5-{3,3-di-[(3-ethyl-2(3)-4,5 - benzbenzothiazolylidene)-methyl] - allylidene}-rhodanine*

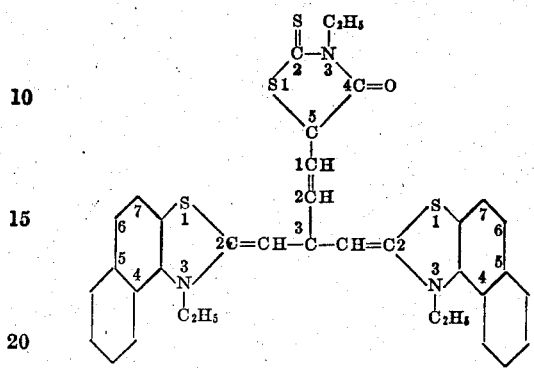

1.03 g. (1 mol.) of 3,3'-diethyl-9-methyl-4,5,4',5'-dibenzothiacarbocyanine chloride, 1.22 g. (2 mols.) of 5-acetanilidomethylene-3-ethylrhodanine and 0.4 g. (2 mols.) of triethylamine were mixed together in 15 cc. of pyridine. The mixture was boiled, under reflux, for 20 minutes. The cool reaction mixture was stirred with 200 cc. of diethyl ether and the ethereal mixture was chilled at 0° C. for several hours. The ethereal layer was decanted and the sticky residue was suspended in 15 cc. of hot methyl alcohol. The methyl alcoholic mixture was chilled to 0° C. and the dye filtered off and washed on the filter with methyl alcohol and finally dried in the air. At this point, the yield of crude dye was 66%. It was recrystallized from pyridine (17 cc. per gram of dye) and a yield of 42% of purified dye, as minute green crystals melting at 248° to 250° C., was obtained.

Our new dyes, both cyanine and merocyanine, are useful as the light absorbing means in the construction of light filters. We have found that our new dyes spectrally sensitize photographic silver halide emulsions. However, the trinuclear cyanine dyes are much more powerful sensitizers than the trinuclear merocyanine dyes. Of the trinuclear cyanine dyes, those prepared by condensing 9-alkylthia-, 9-alkyldibenzothia-, 9-alkylselena-, 9-alkyloxa- and 9-alkyldibenzoxa- carbocyanine dyes (wherein the 9-alkyl group is methyl or ethyl) with a cyclammonium methyl, ethyl, propyl or butyl quaternary salt (particularly benzothiazole, benzoselenazole, naphthothiazole, benzoxazole and naphthoxazole quaternary salts) containing in the alpha position, an alkylmercapto, an arylmercapto, an aryloxy or a halogen atom, are especially useful sensitizers of photographic silver halide emulsions. Those trinuclear cyanine dyes prepared in this manner and containing benzoxazole or naphthoxazole nuclei, together with benzothiazole, naphthothiazole or benzoselenazole nuclei are very efficacious sensitizers.

Our new dyes spectrally sensitize any photographic silver halide emulsion, but more particularly the customarily employed gelatino-silver-chloride, bromide and bromiodide emulsions. In the preparation of photographic emulsions containing our new dyes, it is only necessary to disperse the dyes in the emulsions. The methods of incorporating dyes in emulsions are simple and well known to those skilled in the art. In practice, it is convenient to add the dyes to the emulsions in the form of a solution in an appropriate solvent. Methanol has proven satisfactory as a solvent for our new dyes. The dyes (particularly the trinuclear cyanine dyes) are advantageously incorporated in the finished washed emulsion and should be uniformly distributed throughout the emulsion.

The concentration of our new dyes in the emulsion can vary widely, e. g. from 5 to about 100 mg. per liter of flowable emulsion. The concentration of the dye will vary according to the type of emulsion and according to the effects desired. The suitable and most economical concentration for any given emulsion will be apparent to those skilled in the art, upon making the ordinary tests and observations customarily used in the art of emulsion-making. To prepare a gelatino-silver-halide emulsion, the following procedure is satisfactory: A quantity of the dye is dissolved in methyl alcohol or acetone and a volume of this solution (which may be diluted with water) containing from 5 to 100 mg. of dye is slowly added to about 1000 cc. of a gelatino-silver-halide emulsion, with stirring. Stirring is continued until the dye is thoroughly dispersed in the emulsion.

With most of our dyes, 10 to 20 mg. of dye per liter of gelatino-silver-bromide or bromiodide emulsion (containing about 40 grams of silver halide) suffice to produce the maximum sensitizing effect. With extremely fine grain emulsions which includes most of the ordinarily employed gelatino-silver-chloride emulsions, somewhat larger concentrations of dye may be needed to produce the maximum sensitizing effect.

The above statements are only illustrative, as it will be apparent that our dyes can be incorporated in photographic emulsions by any of the other methods customarily employed in the art; as by bathing a plate or film upon which an emulsion is coated in a solution of the dye in an appropriate solvent, although such a method is not ordinarily to be preferred.

Emulsions sensitized with our new dyes can be coated on to suitable supports, such as glass, cellulose derivative film, resin film or paper in the usual manner.

The following table contains data showing the sensitizing range of several of our new dyes:

*Table*

| Emulsion | Dye (mg. per liter of of emulsion) | Sensitivity extends to— | Maximum |
|---|---|---|---|
| TRINUCLEAR CYANINE DYES | | | |
| | | *Mu.* | *Mu.* |
| Gelatino-silver-bromiodide (40 grams of silver halide per liter). | Ex. 1 | 630 | 590 |
| Do | Ex. 2 | 650 | 590 |
| Do | Ex. 3 | 685 | 545 and 625 |
| Do | Ex. 4 | 650 | 545 and 600 |
| Do | Ex. 5 | 650 | 540 |
| Do | Ex. 6 | 650 | 620 |
| Do | Ex. 7 | 610 | 560 |
| Do | Ex. 8 | 580 | 545 |
| Do | Ex. 9 | 600 | 570 |
| Do | Ex. 10* | 750 | 720 |
| Do | Ex. 11 | 680 | 530 to 595 |
| TRINUCLEAR MEROCYANINE DYES | | | |
| Gelatino - silver - bromiodide (40 grams of silver halide per liter). | Ex. 12* | 730 | 705 |
| Do | Ex. 13* | 710 | 590 and 690 |
| Do | Ex. 14* | 720 | 620 |

*Weak sensitizer.

Still further examples of our new dyes and of the sensitizing action of the dyes on photographic silver halide emulsions, but the foregoing are believed to demonstrate fully the manner of obtaining and using our new dyes.

What we claim as our invention and desire to be secured by Letters Patent of the United States is:

1. A trinuclear dye characterized by a general formula selected from the group consisting of:

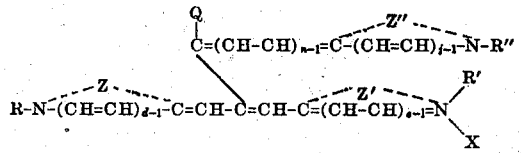

wherein $d$, $e$, $j$ and $n$ each represent a positive integer of from one to two, Q represents a substituent selected from the group consisting of hydrogen and alkyl groups, R, R' and R'' represent alkyl groups not more than two of which alkyl groups are identical, X represents an acid radical, and Z, Z' and Z'' represent the non-metallic atoms necessary to complete heterocyclic organic nuclei, and

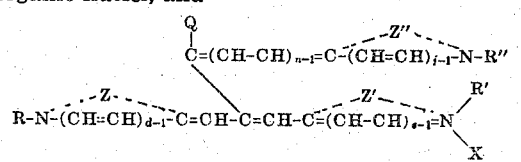

wherein $d$, $e$, $j$ and $n$ each represent a positive integer of from one to two, Q represents a substituent selected from the group consisting of hydrogen and alkyl groups, R, R' and R'' represent alkyl groups, X represents an acid radical, and Z, Z' and Z'' represent the non-metallic atoms necessary to complete a heterocyclic organic nuclei not more than two of which nuclei are identical.

2. A trinuclear dye characterized by the following general formula:

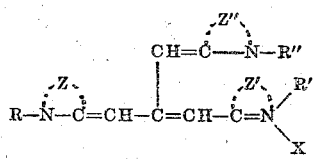

wherein R, R' and R'' represent alkyl groups, X represents an acid radical and Z, Z' and Z'' represent the non-metallic atoms necessary to complete a heterocyclic organic nuclei selected from the group consisting of benzoxazole, benzothiazole, benzoselenazole, naphthothiazole, naphthoxazole and quinoline nuclei, not more than two of which nuclei are identical.

3. A trinuclear cyanine dye characterized by the following general formula:

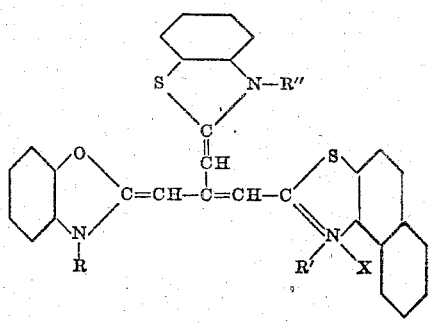

wherein R, R' and R'' each represent an alkyl group of the formula $C_nH_{2n+1}$ wherein $n$ represents a positive integer of from one to four, and X represents an acid radical.

4. 3,3'-diethyl - 9 -[(3-methyl-2(3) - benzothiazolylidene) methyl] - 4',5'- benzoxathiacarbocyanine iodide.

5. A trinuclear cyanine dye characterized by the following general formula:

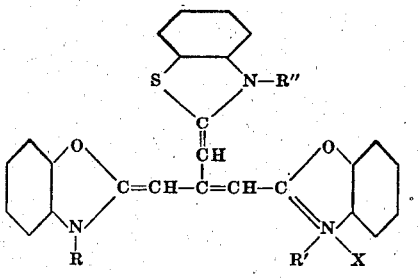

wherein R, R' and R'' each represent an alkyl group of the formula $C_nH_{2n+1}$ wherein $n$ represents a positive integer of from one to four.

6. 3,3'-diethyl-9-[(3-ethyl-2(3) - benzothiazolylidene) methyl]oxacarbocyanine iodide.

7. 3,3'-diethyl - 9 -[(3-methyl-2(3) - benzothiazolylidene) methyl]-thiacarbocyanine bromide.

8. A process for preparing a trinuclear polymethine dye comprising condensing, in the presence of an acid-binding agent, a carbocyanine dye containing an alkyl group on the central carbon atom of the trimethine chain, with an organic compound selected from the group consisting of cyclammonium quaternary salts containing, in a reactive position, a substituent selected from the group consisting of alkylmercapto groups, arylmercapto groups, aryloxy groups, halogen atoms and β-arylaminovinyl groups.

9. A process for preparing a trinuclear cyanine dye comprising condensing, in the presence of an acid-binding agent, a carbocyanine dye containing a methyl group on the central carbon atom of the trimethine chain, with a cyclammonium quaternary salt containing, in a reactive position, a substituent selected from the group consisting of alkylmercapto groups, arylmercapto groups, aryloxy groups, halogen atoms and β-arylaminovinyl groups.

10. A process for preparing a trinuclear cyanine dye comprising condensing, in the presence of an acid-binding agent, a carbocyanine p-toluenesulfonate containing a methyl group on the central carbon atom of the trimethine chain, with a cyclammonium quaternary salt containing, in a reactive position, a substituent selected from the group consisting of alkylmercapto groups, arylmercapto groups, aryloxy groups, halogen atoms and β-arylaminovinyl groups.

11. A process for preparing a trinuclear cyanine dye comprising condensing, in the presence of a tertiary organic base acid-binding agent, the dissociation constant of the organic base being substantially greater than that of pyridine, a carbocyanine dye containing a methyl group on the central carbon atom of the trimethine chain, with a cyclammonium quaternary salt containing, in a reactive position, a substituent selected from the group consisting of alkylmercapto groups, arylmercapto groups, aryloxy groups, halogen atoms and β-arylaminovinyl groups.

LESLIE G. S. BROOKER.
FRANK L. WHITE.